July 12, 1938.   B. F. LEWIS   2,123,471
TRAP
Filed Sept. 2, 1937
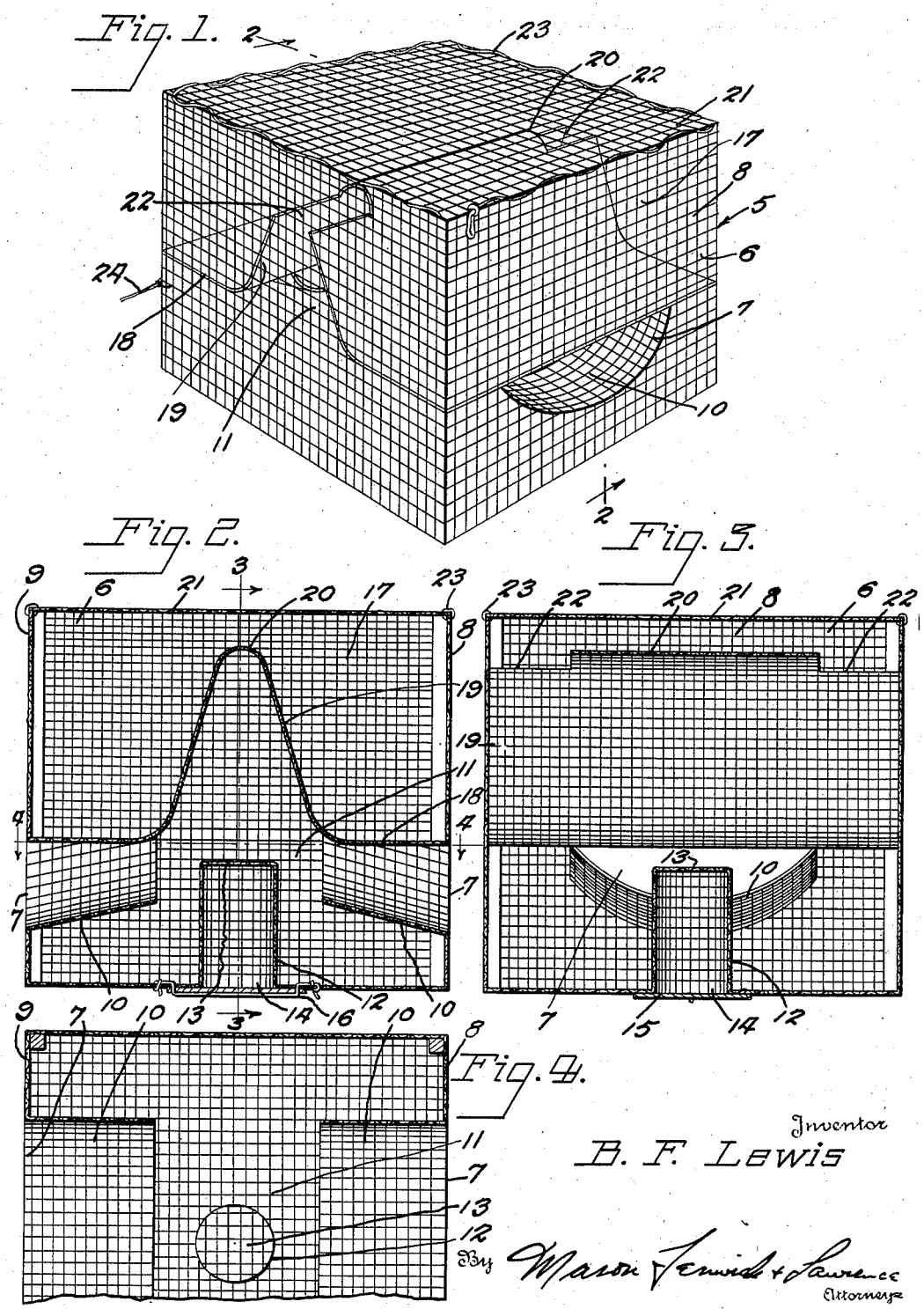
Inventor
B. F. Lewis
By Mason, Fenwick & Lawrence
Attorneys Patented July 12, 1938

2,123,471

UNITED STATES PATENT OFFICE 2,123,471

TRAP

Benjamine F. Lewis, Harryhogan, Va.

Application September 2, 1937, Serial No. 162,195

2 Claims. (Cl. 43—100)

This invention relates to traps; and more particularly to one designed to conform with the habits of crabs.

A careful study of crabs and their feeding characteristics has disclosed that upon approaching an entrance with a bottom structure, the crab will walk on the supporting surface rather than attempt to swim in through the opening. It has been noticed that when it seizes food, its first reaction is to run with it, and this is particularly true where other crabs are attempting to seize the food. It has also been noticed that in running off, the crab has a tendency to take the food toward the bottom. Its next reaction is to swim upward toward the surface. As a result of these observations, I have constructed a trap embodying a structure to take advantage thereof.

Other objects of the invention will become apparent as the detailed description thereof proceeds.

In the drawing:

Figure 1 is a perspective of the trap showing one of the entrances;

Figure 2 is a vertical section taken on the line 2—2 of Figure 1;

Figure 3 is a vertical section taken on the line 3—3 of Figure 2; and

Figure 4 is a fragmentary horizontal section taken on the line 4—4 of Figure 2.

Referring to the drawing, in which similar parts are designated by like numerals:

Numeral 5 designates a rectangular shaped trap composed of reticulated material 6 having entrances at 7 on opposite ends 8 and 9. The entrances 7 are relatively wide, as compared to height, to conform to the shape of a crab, and have upwardly sloping passages 10 leading into a bait chamber 11. Positioned in the center of the bait chamber 11 is a bait cup 12 of open mesh or reticulated material of cylindrical form, the top 13 being closed and its bottom 14 normally open to receive bait. A disc 15 on the exterior of the trap acts as a closure for the bottom 14 and is secured in position by cord 16 or other securing means. A trap chamber 17 is formed in the upper part of the trap by a partition 18 having an inverted U-shaped portion 19 directly above the termination of the passages 10. The top 20 of the inverted U-shaped portion 19 is spaced from the top 21 of the trap 5. Openings 22 formed in the top 20 of the inverted U-shaped portion 19 give access to the trap chamber 17. The top 21 is interlaced with lacings 23 so that the top 21 may be removed in emptying the trap.

Obviously fasteners other than lacings may be utilized, and the top may be hinged if desired. Likewise reticulated material is used because of its lightness and mesh construction. However, other material can be utilized without departing from the spirit of my invention.

The trap may be anchored to a stick or other securing means by way of a line 24.

As actually used, the disc 15 will be removed from the bait cup 12, the cup filled with meat or other bait material, the disc secured in place and the trap lowered into the water, having been previously secured. The crabs will enter through the entrances 7 and walk up the sloping passages 10. Upon approaching the bait, the crabs will attempt to seize the same through the mesh of the bait cup 12 and attempt to run with it. The crabs will then have a tendency to collect in the bait chamber, but will gradually attempt to escape by swimming upwardly into the inverted U-shaped portion 19, escape through the openings 22, and thence into the trap chamber 17. Upon the trap being raised, the top 21 can be removed and the crabs taken from the trap chamber.

Although my invention is primarily directed to a trap for crabs, it may be used for other crustacea, and for other purposes falling within the scope of my invention.

Numerous variations may doubtless be devised by persons skilled in the art without departing from the principles of my invention. I, therefore, desire no limitations to be imposed on my invention, except such as are indicated in the appended claims.

What I claim is:

1. A trap comprising a main body divided into bait and trap chambers, said main body having an entrance with a passageway leading into said bait chamber, a bait cup in said bait chamber, a partition of inverted U-shape dividing the bait and trap chambers, said inverted U-shaped partition having an opening at the top thereof to give communication to the trap chamber.

2. A trap comprising a main body divided into bait and trap chambers, said main body having an entrance with a passageway leading into said bait chamber, a bait cup in said bait chamber, a partition extending over said passageway and bait cup and dividing the bait and trap chambers, said partition having an opening at the top thereof to give communication to the trap chamber.

BENJAMINE F. LEWIS.